United States Patent
Yasuda et al.

[11] Patent Number: 4,555,615
[45] Date of Patent: * Nov. 26, 1985

[54] CARBON ROD ASSEMBLY FOR ARC GOUGING AND BLASTING OF METALLIC ARTICLE

[75] Inventors: Haruo Yasuda, Ohgaki; Kunihiko Yoshida, Motosu; Yasuro Iwai, Ohgaki; Takayuki Mizutani, Yoro, all of Japan

[73] Assignee: Ibigawa Electric Industry Company, Ltd., Japan

[*] Notice: The portion of the term of this patent subsequent to Jan. 8, 2002 has been disclaimed.

[21] Appl. No.: 637,784

[22] Filed: Aug. 6, 1984

Related U.S. Application Data

[63] Continuation of Ser. No. 352,758, Feb. 26, 1982, Pat. No. 4,492,850.

[30] Foreign Application Priority Data

Mar. 3, 1981 [JP] Japan .................................. 56-29348

[51] Int. Cl.⁴ .................................................. B23K 9/24
[52] U.S. Cl. .................................. 219/145.21; 219/70; 219/145.1
[58] Field of Search .......... 219/145.1, 145.21, 145.22, 219/145.23, 70; 373/91

[56] References Cited

U.S. PATENT DOCUMENTS

| | | | |
|---|---|---|---|
| 3,030,544 | 4/1962 | Zamboldi et al. | 219/70 X |
| 3,633,063 | 1/1972 | Ando | 219/145.21 |
| 3,796,853 | 3/1974 | Matsuo et al. | 219/145.21 |
| 4,349,910 | 9/1982 | Belz | 373/91 |
| 4,395,617 | 7/1983 | Maeda et al. | 219/145.1 |

FOREIGN PATENT DOCUMENTS

| | | |
|---|---|---|
| 47-32059 | 9/1972 | Japan . |
| 48-26231 | 3/1973 | Japan . |
| 51-35968 | 9/1976 | Japan . |
| 52-39076 | 9/1977 | Japan . |

*Primary Examiner*—Roy N. Envall, Jr.
*Assistant Examiner*—C. M. Sigda
*Attorney, Agent, or Firm*—Parkhurst & Oliff

[57] ABSTRACT

A carbon rod assembly is disclosed which includes a first carbon rod piece having a projection at one end thereof and a second carbon rod piece having a socket hole at one end thereof. External and internal screw threads of ½ to 3 turns are formed on the projection and socket hole respectively, so that the first and second carbon rod pieces are firmly connected by inserting the projection into the socket hole and thereafter rotating the carbon rod pieces relative to each other.

6 Claims, 21 Drawing Figures

CARBON ROD ASSEMBLY FOR ARC GOUGING AND BLASTING OF METALLIC ARTICLE

This is a continuation of application Ser. No. 352,758 filed Feb. 26, 1982 which in turn is a U.S. Pat. No. 4,492,850.

BACKGROUND OF THE INVENTION

1. Field of the Invention

This invention relates to a carbon rod assembly for arc gouging and blasting of a metallic article, and more particularly to a carbon rod assembly having similarly shaped first and second carbon rod pieces connected to each other for arc gouging and blasting of a metallic article.

2. Description of the Prior Art

Heretofore, arc gouging and blasting of a metallic article such as a steel article has been carried out by establishing an electric arc between a carbon rod held by a holder with an air jetting nozzle and a metallic workpiece surface, so as to melt the metal surface of the workpiece by the arc and to blow off the thus molten metal by compressed air ejected from the air jetting nozzle. This method of arc gouging and blasting of the prior art has a shortcoming in that the high temperature of the electric arc requires a certain clearance kept between the holder and the workpiece, so that stub portions of the carbon rods corresponding to about 20% of the new carbon rods are discarded and wasted to keep the thus required clearance.

To mitigate the waste of the carbon rods, it has been proposed to connect the carbon rods with a metallic sleeve or a carbonaceous nipple or to connect them by forming a projection and a recess at opposite ends of each carbon rod so as to facilitate the joining of adjacent carbon rods by inserting the projection of one carbon rod into the recess of the adjacent carbon rod with or without adhesive applied thereto. Such proposals of connection of adjacent carbon rods have shortcomings in that extra parts for connection, e.g., sleeves or nipples are necessary at the job site, that formation of the projections and recesses and the application of the adhesive are time-consuming and costly, and that the connected portions are susceptible to deformation due to heat generated thereat, which deformation tends to hamper the establishment of stable arc for gouging and blasting.

SUMMARY OF THE INVENTION

Therefore, an object of the present invention is to obviate the above-mentioned shortcomings of the prior art by providing an improved carbon rod assembly for arc gouging and blasting of a metallic article.

Another object of the invention is to provide a carbon rod structure which facilitates easy connection of adjacent carbon rod pieces and yet ensures generation of stable arc, so as to eliminate the waste of stub portions of the carbon rods while ensuring reliable arc gouging and blasting performance.

To fulfill the above-mentioned objects, a carbon rod assembly for arc gouging and blasting of a metallic article according to the present invention comprises a first carbon rod piece having an axial projection of substantially frusto-conical shape formed at one end thereof, diameter of said projection being smaller than diameter of said first carbon rod piece at said one end thereof and decreasing as said projection extends away from the first carbon rod piece, external screw threads formed at a selected portion of said projection, and a metallic coating continuously covering the outer periphery of said first carbon rod piece and at least a portion of said projection; and a second carbon rod piece having an axial socket hole of frusto-conical shape formed at one end thereof, diameter of said socket hole being smaller than diameter of said second carbon rod piece, internal screw threads formed at a selected portion of said socket hole so as to mesh with said external screw threads, and a metallic coating continuously covering the outer periphery of said second rod piece and at least a portion of said socket hole; said projection and said socket hole having the same tapers as one another, axial length of said projection being smaller than the axial depth of said socket hole, whereby said first and second carbon rod pieces are adapted to be firmly joined together by inserting said projection to said socket hole and thereafter rotating said carbon rod pieces relative to each other.

In a preferred embodiment of the invention, the external and internal screw threads are formed at the foot portion of the axial projection of the first carbon rod piece and at the open end portion of the socket hole of the second carbon rod piece.

In another embodiment of the invention, the external and internal screw threads are formed at the tip of the axial projection of the first carbon rod piece and at the bottom portion of the socket hole of the second carbon rod piece.

In another embodiment of the invention, the external and internal screw threads are formed at intermediate portions of the axial projection and the socket hole of the first and second carbon rod pieces.

It is another object of the present invention to provide a carbon rod assembly of the above-mentioned type, in which a cylindrical portion or a boss is integrally formed at the tip of the frusto-conical projection of the first carbon rod piece, while a corresponding cylindrical hole or a recess is formed at the bottom of the frusto-conical socket hole of the second carbon rod piece.

A still other object of the present invention is to provide a carbon rod assembly of the first-mentioned type in which the above-mentioned projection of the first carbon rod piece is not of the frusto-conical shape but of a combination of a cylindrical portion and a frusto-conical portion or boss integrally formed at the tip of the cylindrical portion, while said socket hole of the second carbon rod piece is not of the frusto-conical shape but of a combination of a cylindrical hole and a frusto-conical recess formed at the bottom of the cylindrical hole.

When a cylindrical portion or boss is formed at the tip of the frusto-conical portion of the projection and a cylindrical hole or recess is formed at the bottom of the frusto-conical hole of the socket hole, the external and internal screw threads may be formed on the sidewalls of the cylindrical portion or boss and the cylindrical hole or recess.

DESCRIPTION OF THE ACCOMPANYING DRAWINGS

For a better understanding of the invention, reference is made to the accompanying drawings, in which:

FIG. 13 through FIG. 21 are views similar to FIG. 4 through FIG. 12 respectively, showing socket holes bisected by slits. Throughout the different views of the drawings, 1 is an air jetting nozzle, 2 is a holder, 3 is a carbon rod, 4 is a steel workpiece, 5 is a projection, 6 is a socket hole, 7 shows screw threads, 8 is a foot portion, 9 is an open end portion, 10 is metallic coating, 11 is an annular edge portion, 12 is a tip portion, 13 is a bottom portion, 14 is a cylindrical portion, 15 is a frusto-conical portion, 16 and 19 are frusto-conical holes, 17 and 18 are cylindrical holes, 20 is a frusto-conical boss, 21 is a spherical bottom surface, and 22 is a slit.

DESCRIPTION OF THE PREFERRED EMBODIMENTS

Before entering the details of the present invention, the prior art will be briefly reviewed.

Figure 1:
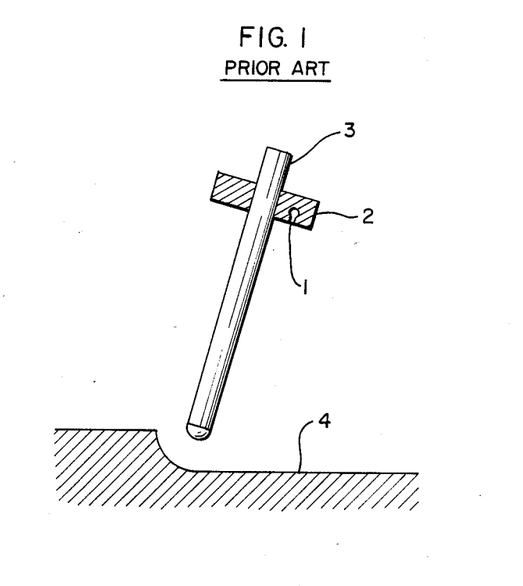
FIG. 1 is an explanatory diagram of arc gouging and blasting operation of the prior art.

Referring to FIG. 1, a holder 2 with an air jetting nozzle 1 carries a carbon rod 3 acting as an electrode, and an electric arc is established between the carbon rod 3 and the surface of a metallic workpiece such as a steel workpiece 4, so as to melt the surface metal portion of the workpiece 4. The thus molten metal is blown off by compressed air ejected from the air jetting nozzle 1. As the carbon rod 3 is consumed by the electric arc, the holder 2 must be moved toward the workpiece 4 to maintain the arc. Since the temperature of the arc is as high as 3,000 to 4,000° C, the holder 2 must be spaced from the arc by a clearance of about 3 cm or more, so as to protect the operator and the holder 2. When the method of arc gouging and blasting was originally developed and used, about a 5 cm long stub portion of the carbon rod 3 including a gripped portion of about 2 cm and the above-mentioned clearance of about 3 cm was discarded to ensure the minimum clearance.

The discarded stub portions correspond to about 20% of the new carbon rods and constitute a considerable loss, so that several types of connectible carbon rods for arc gouging and blasting have been proposed to use up the stub portions and not to discard them. Especially, connection of the carbon rods by metallic sleeves or carbonaceous nipples or connection of carbon rods by forming a projection and recess at opposite ends of each carbon rod and inserting the projection of one carbon rod into the recess of the adjacent carbon rod with adhesive applied thereto is well known. However, such connections of the carbon rods by the prior art had shortcomings in that extra materials are necessary for connection at job site, that the application of the adhesive and actual connecting operation of the carbon rods are time-consuming, and that the connected portions are susceptible to deformation by heat generated thereat which deformation tends to make it difficult to establish a stable electric arc.

Figure 2:
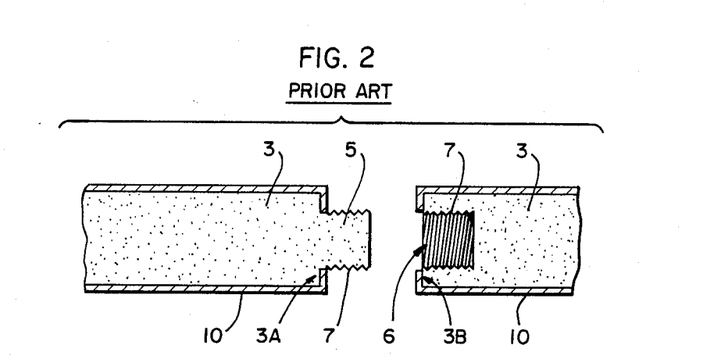
FIG. 2 is a schematic sectional view of a joint portion of conventional carbon rods.

FIG. 2 shows a connectible carbon rod disclosed by Japanese Utility Model Publication No. 32,059/72. The carbon rod 3 of the figure has a threaded cylindrical projection 5 at one end thereof and a threaded cylindrical socket hole 6 at the opposite end thereof. Metallic coating 10 is continuously applied to both the outer periphery of the carbon rod 3 and to annular edge portions 3A and 3B, but not on screw threads 7 of the projection 5 and the socket hole 6. This connectible carbon rod 3 has a shortcoming in that, when it is actually used at job site for arc gouging and blasting, if the operator intends to connect the carbon rods 3, he has to grasp a holder 2 of about 3.5 kg or heavier by his one hand and screw a new carbon rod 3 into the stub portion of a used carbon rod 3 by his other hand. Since the operator usually wears thick protective gloves on his hands during the arc gouging and blasting operation, it has been difficult for him to connect the carbon rod 3 of FIG. 2 by holding the heavy holder 2 with his one hand and delicately positioning and rotating a new carbon rod 3 with his other hand. If the operator disconnects the power supply to the holder 2 and places the holder 2 on a suitable work table for connecting a new carbon rod 3 on the work table, the work of connecting the carbon rods 3 involves the switching of a large electric current from a power supply source and the moving of the operator to the work table, so that the connecting work becomes time-consuming and costly. Thus, the connectible carbon rods 3 of FIG. 2 have not been used on a commercial basis.

Figure 3:
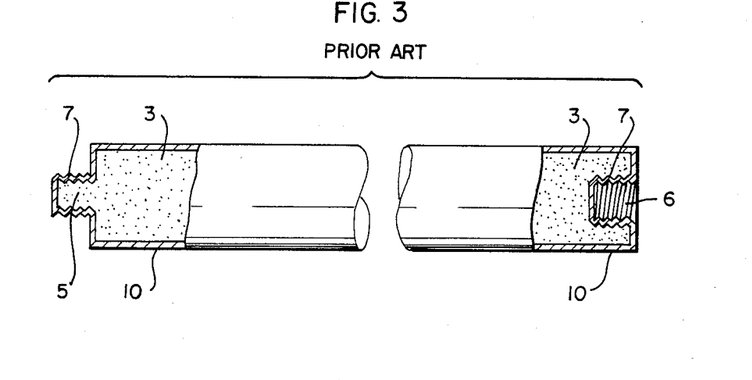
FIG. 3 is a partially cutaway side view of a conventional carbon rod for arc gouging and blasting.

FIG. 3 shows another connectible carbon rod 3 which was disclosed by Japanese Utility Model Publication No. 35,968/76. As compared with FIG. 2, the connectible carbon rod 3 of FIG. 3 is characterized by the metallic coatings 10 applied to the entire surfaces of screw threads 7 of both the projection 5 and the socket hole 6, so that the screw threads 7 are well protected. Although such metallic coatings 10 reduce the risk of chipping or breakage of the projection 5 and the socket hole 6, the carbon rod 3 of FIG. 3 has shortcomings in that the connection is not easy because a large number of revolutions of the carbon rod 3 is necessary to tighten the meshing of the external and internal screw threads 7, so that if the metallic coatings 10 of the screw threads 7 are uneven such unevenness of the metallic coatings 10 tends to make the meshing of the external and internal screw threads 7 difficult, and it is difficult for the operator to connect a new carbon rod 3 to the stub of a used carbon rod 3 with one hand.

Figure 4:
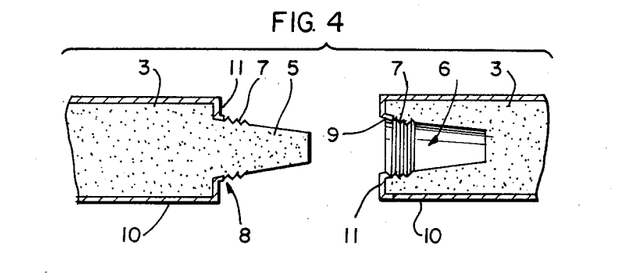
FIG. 4 is a schematic fragmentary sectional view of a first carbon rod piece with an axial projection and a second carbon rod piece with a socket hole which are used in the carbon rod assembly according to the present invention.

FIG. 4 illustrates an embodiment of the carbon rod asssembly according to the present invention. In the figure, a frusto-conical projection 5 is formed at one end of a first carbon rod piece 3 of circular columnar shape. A socket hole 6 of frusto-conical shape is bored at one end of a second carbon rod piece 3, so that the socket hole 6 can receive the above-mentioned projection 5. External screw threads of a few turns are formed on the foot portion 8 of the projection 5, and internal screw threads 7 of a few turns are formed at the open end portion 9 of the socket hole 6 so as to mesh with the external screw threads 7 of the projection 5. Metallic coating 10 continuously covers the outer periphery of the carbon rod piece 3 and the non-threaded part of the foot portion 8 of the projection 5 and the non-threaded part of the open end portion 9 of the socket hole 6.

The number of turns of the external and internal screw threads 7 is preferably one half to three. If the carbon rod piece 3 has a comparatively large diameter, the screw threads 7 of one half turn are sufficient for both the projection 5 and the socket hole 6. On the other hand, when the diameter of the carbon rod piece 3 is comparatively small, the screw threads 7 with a large number of turns such as up to three turns are formed on the projection 5 and the socket hole 6.

Metallic coating 10 continuously covers the outer periphery of the carbon rod piece 3 and those edge surfaces which come in contact with adjacent carbon rod piece 3 when the projection 5 is coupled with the socket hole 6 of the adjacent carbon rod piece 3. More particularly, the metallic coating 10 of the first carbon rod piece 3 continuously covers the outer periphery of the carbon rod piece 3, an annular edge portion 11 surrounding the foot of the projection 5, and the non-threaded part of the foot portion 8 of the projection 5. In FIG. 4, the metallic coating 10 of the second carbon rod piece 3 with the socket hole 6 continuously covers the outer periphery of the carbon rod piece 3, an annular edge portion 11 surrounding the open end portion 9 of the socket hole 6, and the non-threaded part of the open end portion 9 of the socket hole 6. It sould be noted that, although the projection 5 of the first carbon rod piece 3 and the socket hole 6 of the second carbon rod piece 3 are separately shown in FIG. 4, the projection 5 and the socket hole 6 are formed at opposite ends of one carbon rod piece 3. Accordingly, the metallic coating 10 extends from the non-threaded part of the foot portion 8 of the projection 5 at one end of each carbon rod piece 3, through the annular edge surface 11, the outer periphery of the carbon rod piece 3, and the annular edge surface 11 at the opposite end of the carbon rod piece 3, to the non-threaded part of the open end portion 9 of the socket hole 6.

When the external screw threads 7 of the projection 5 of the first carbon rod piece 3 are snugly meshed with the internal screw threads 7 of the socket hole 6 of the second carbon rod piece 3, the metallic coatings 10 at the annular edges 11 come in good electric contact with each other, so that as compared with the conventional structure of FIG. 3, the embodiment of the invention as shown in FIG. 4 can dispense with the metallic coatings of the screw threads. Even if the fitting of the projection 5 and the socket hole 6 does not allow the direct contact of the metallic coatings 10 of the annular edge portions 11 of the adjacent carbon rod pieces 3, the metallic coating 10 at the non-threaded part of the foot portion 8 of the projection 6 comes in good electric contact with the metallic coating 10 at the non-threaded part of the open end portion 9 of the socket hole 6, so that reliable electric connection between the adjacent carbon rod pieces 3 is ensured. Besides, the metallic coatings 10 at the annular edge portions 11, the non-threaded part of the foot portion 8 of the projection 5, and the non-threaded part of the open end portion 9 of the socket hole 6 act to protect the coupled portion of the adjacent carbon rod pieces 3 against exposure to air, so as to eliminate breakage of the joint portion by oxidation at an elevated temperature which has been experienced with convention carbon rods.

In operation, when the projection 5 of the first carbon rod piece 3 is inserted into the socket hole 6 of the second carbon rod piece 3, the projection 5 is almost fully fitted in the socket hole 6, and a slight rotation of the first carbon rod piece 3 relative to the second carbon rod piece 3 causes the external screw threads 7 of the projection 5 to fully mesh with the internal screw threads 7 of the socket hole 6, so that the two carbon rod pieces 3 are firmly connected both electrically and mechanically to provide a sturdy joint therebetween. Such connecting operation can be effected easily by one hand of the operator while holding the heavy holder 2 with his other hand. The provision of the screw threads 7 eliminates the undesired separation of the once connected or coupled carbon rod pieces 3 which separation has been experienced with the joint of simple-insertion type such as that disclosed by U.S. Pat. No. 3,030,544.

The external and internal screw threads 7 can be regular threads or taper threads.

Figure 5:
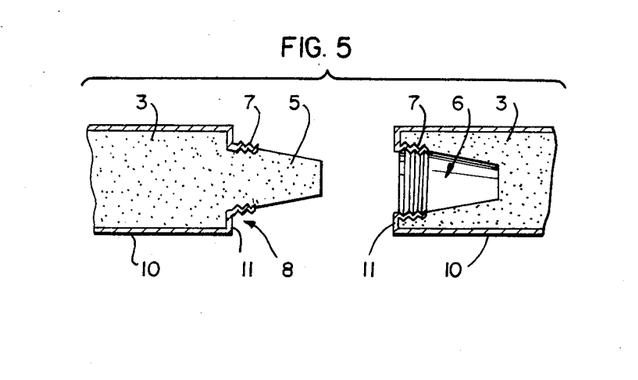
FIG. 5 is a view similar to FIG. 4, showing carbon rod pieces having external and internal screw threads covered with metallic coatings.

In another embodiment of the invention illustrated in FIG. 5, both the external screw threads 7 formed at the foot portion 8 of the projection 5 and the internal screw threads 7 formed at the open end portion 9 of the socket hole 6 are covered by metallic coatings 10. The metallic coatings 10 extend continuously from the outer periphery of the carbon rod pieces 3 to the screw threads 7 through the annular edge portions 11. The metal coatings 10 of the screw threads 7 have advantages in that the carbonaceous material of the carbon rod which is more brittle than metal is protected and freed from breakage during the meshing of the screw threads 7 of the adjacent carbon rod pieces 3 by the metallic coatings 10, and that the metal-to-metal contact is established when the screw threads 7 of the projection 5 are meshed with the screw threads 7 of the socket hole 6, so as to provide a high electric conductivity between the thus connected two carbon rod pieces 3.

Obviously, the metallic coatings 10 of the screw threads 10 also provide easy handling of the screw threads 7 during the connecting operation of the adjacent carbon rod pieces 3 without any extra care, because the metallic coatings 10 prevent the carbonaceous materials of the screw threads 7 from directly striking each other and protect them against breakage by such direct striking.

To cmpensate for the dispersion of the thickness of the metal coatings 10 at the screw threads 7, a large pitch may be used at the external and internal screw threads 7 of the projection 5 and the socket hole 6. It is also possible to extend the metallic coatings 10 to both the entire outer surface of the projection 5 and the entire inner surface of the socket hole 6.

Figure 6:
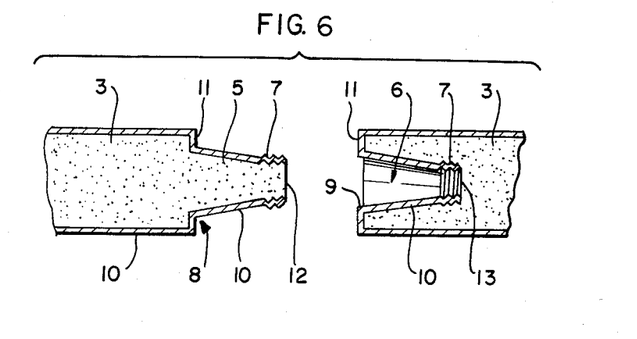
FIG. 6 is a view similar to FIG. 4, showing carbon rod pieces having external screw threads and internal screw threads formed at the tip of a projection and at the bottom of a socket hole.
Figure 7:
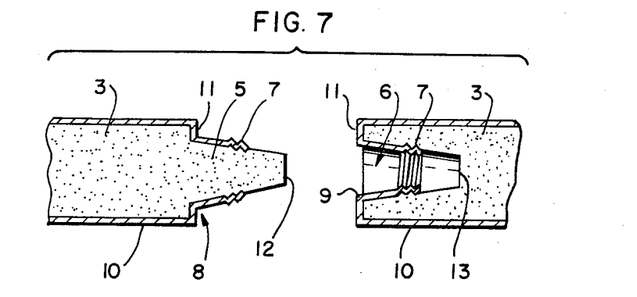
FIG. 7 is a view similar to FIG. 4, showing carbon rod pieces having external screw threads and internal screw threads formed at an intermediate portion of a projection and at an intermediate portion of a socket hole.

The external and internal screw threads 7 can be formed at the tip portion 12 of the projection 5 and at the bottom portion 13 of the socket hole 6 as shown in the embodiment of FIG. 6. Furthermore, the external screw threads 7 can be formed at an intermediate portion of the projection 5 between the foot portion 8 and the tip portion 12 thereof, and the internal screw threads 7 can be formed at an intermediate portion of the socket hole 6 between the open end portion 9 and the bottom portion 13 thereof, as shown in the embodiment of FIG. 7. The screw threads 7 of the embodiment of FIG. 7 are provided with metallic coatings 10.

Figure 8:
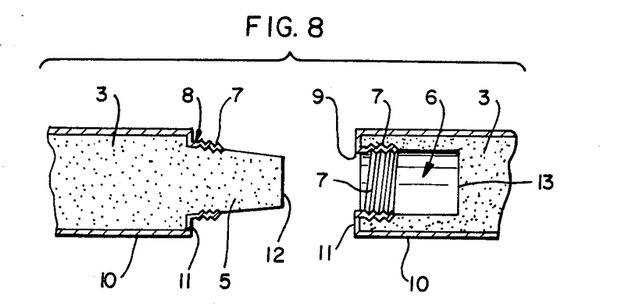
FIG. 8 is a view similar to FIG. 4, showing a first carbon rod piece having a frusto-conical projection with external screw threads formed at the foot portion thereof and a second carbon rod piece having a cylindrical socket hole with internal screw threads formed at the open end thereof.

The shapes of the projection 5 and the coacting socket hole 6 in the carbon rod assembly of the present invention can be modified as shown in FIG. 8 through FIG. 12. In the embodiment of FIG. 8, the projection 5 is of frusto-conical shape and has a foot portion 8 provided with external screw threads 7 covered by the metallic coating 10, while the socket hole 6 is not of the frusto-conical shape but of cylindrical shape with internal screw threads 7 formed at the open end portion 9 thereof and covered by the metallic coating 10. It is of course possible to extend the metallic coating 10 so as to cover the entire outer surface of the projection 5, and the projection 5 fully covered by the metallic coating 10 is easy to handle and is capable of establishing a hardly-separable stable joint with the coacting socket hole 6.

Figure 9:
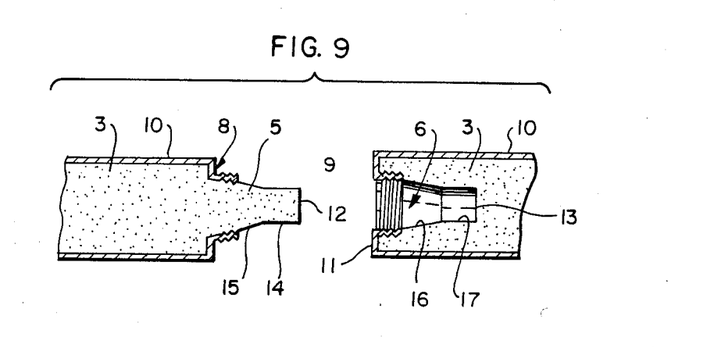
FIG. 9 is a view similar to FIG. 4, showing a first carbon rod piece having a projection comprised of a combination of a frusto-conical foot portion and a cylindrical boss and a second carbon rod piece having a socket hole including a frusto-conical open end hole and a cylindrical recess.

The projection 5 of the embodiment of FIG. 9 is a combination of a frusto-conical foot portion 15 and a cylindrical portion 14 integrally formed with the tip of the frusto-conical portion 15, while the socket hole 6 of the embodiment has a shape corresponding to that of the projection 5. More particularly, the socket hole 6 of the embodiment of FIG. 9 includes a frusto-conical hole 16 at the open end side thereof and a cylindrical hole 17 integrally formed at the bottom of the frusto-conical hole 16.

Figure 10:
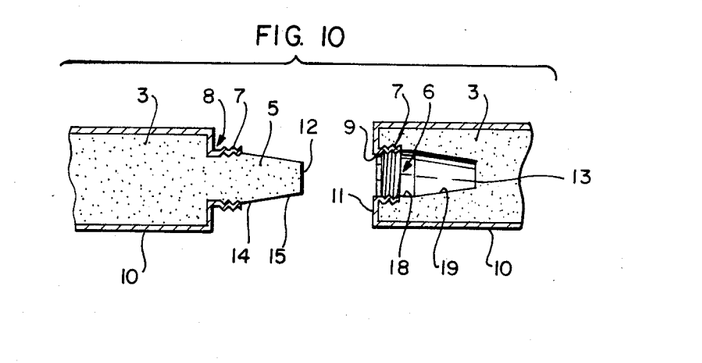
FIG. 10 is a view similar to FIG. 4, showing a first carbon rod piece having a projection comprised of a combination of a cylindrical foot portion and a frusto-conical boss and a second carbon rod piece having a socket hole including a cylindrical open end hole and a frusto-conical recess.

FIG. 10 shows an embodiment of the present invention, wherein a first carbon rod piece 3 has a projection comprised of a combination of a cylindrical portion 14 at the foot thereof and a frusto-conical portion 15 integrally formed at the tip of the cylindrical portion 14, while a second carbon rod piece 3 has a socket hole 6 of the shape corresponding to that of the projection 5. More particularly, the socket hole 6 of the embodiment of FIG. 10 has a cylindrical hole 18 at the open end side thereof and a frusto-conical hole 19 formed at the bottom of the cylindrical hole 18. The formation of the frusto-conical portion 15 at the tip of the projection 5 makes the insertion of the projection 5 into the socket hole 6 easy, because the frusto-conical portion 15 easily fits in the frusto-conical hole 19 of the socket hole 6 by simple pushing of the first carbon rod piece 3. Complete joining of the first and second carbon rod pieces 3 can be established by rotating them relative to each other so as to cause the metal coated external screw threads 7 at the cylindrical foot portion 14 of the projection 5 to tightly mesh with the coacting metal coated internal screw threads 7 at the cylindrical open end hole 18 of the socket hole 6. Thus, the connection of the first and the second carbon rod pieces 3 can be easily carried out by one hand of the operator. It is noted that the embodiment of FIG. 10 can be produced by modifying the embodiment of FIG. 5 through making both the foot portion 8 of the projection 5 and the open end portion 9 of the socket hole 6 cylindrical, so as to improve the engagement and meshing of the projection 5 with the external screw threads 7 and the socket hole 6 with the internal screw threads 7.

Figure 11:
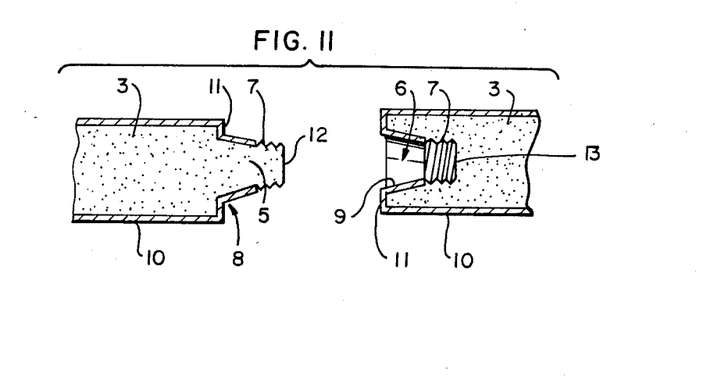
FIG. 11 is a view similar to FIG. 4, showing a first carbon rod piece having a projection comprised of a frusto-conical foot portion and a cylindrical threaded boss and a second carbon rod piece having a socket hole including a frusto-conical open end hole and a cylindrical threaded recess.

In another embodiment FIG. 11, the projection 5 of a first carbon rod piece 3 includes a frusto-conical portion 15 extending from one end of the carbon rod piece 3 and a cylindrical portion 14 integrally formed with the tip portion of the frusto-conical portion 15. External screw threads 7 are provided on the sidewall of the cylindrical portion 14. The coacting socket hole 6 of a second carbon rod piece 3 includes a frusto-conical hole 16 at open end side of the socket hole 6 and a cylindrical hole 17 integrally formed at the bottom of the frusto-conical hole 16. Internal screw threads 7 are formed on the sidewall of the cylindrical hole 17. The tapered surfaces of both the frusto-conical portion 15 of the projection 5 and the frusto-conical hole 16 of the socket hole 6 are covered by metallic coatings 10 extending continuously from the outer peripheries of the carbon rod pieces 3. In operation, the first and second carbon rod pieces 3 are firmly coupled by the meshing of the external and internal screw threads 7 so that a reliable electric connection is established by the tight contact of the metallic coatings 10 at the tapered surfaces of both the projection 5 and the socket hole 6, and such coupling can be easily accomplished with one hand of the operator. The number of turns of the external and internal screw threads 7 is preferably less than three, so as to ensure the easy coupling of the two adjacent carbon rod pieces with one hand. In the embodiment of FIG. 11, it is not desirable to extend the metallic coatings 10 to the external and internal screw threads 7, because such metallic coatings 10 would make the meshing of the external and internal screw threads 7 difficult. Such difficulty of the meshing cannot be eliminated even if the diameters of the threaded portions of the projection 5 and socket hole 6 are modified, because too big or too small threaded portions are difficult to handle in the coupling operation.

Figure 12:
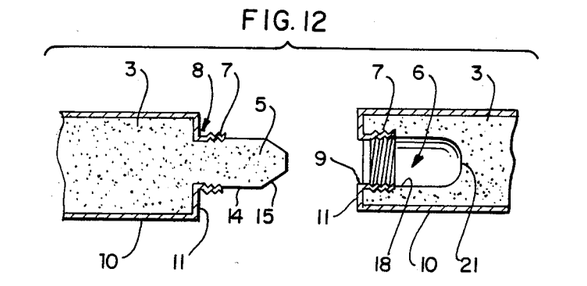
FIG. 12 is a view similar to FIG. 4, showing a first carbon rod piece having a projection comprised of a combination of a cylindrical threaded foot portion and a frusto-conical boss and a second carbon rod piece having a socket hole including a cylindrical threaded open end hole and a spherical bottom surface.
Figure 13:
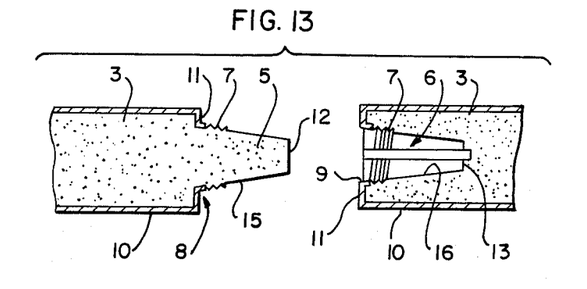
Figure 14:
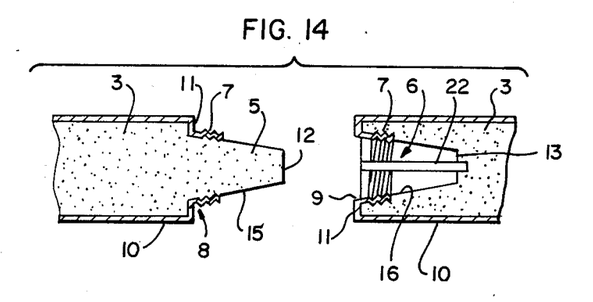
Figure 15:
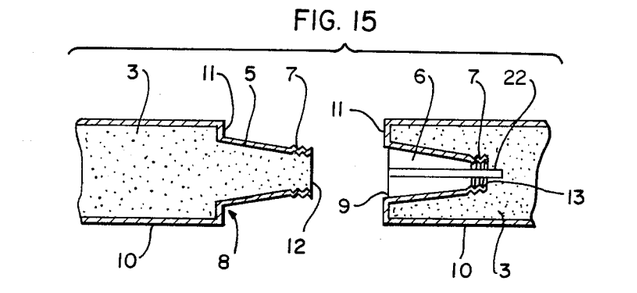
Figure 16:
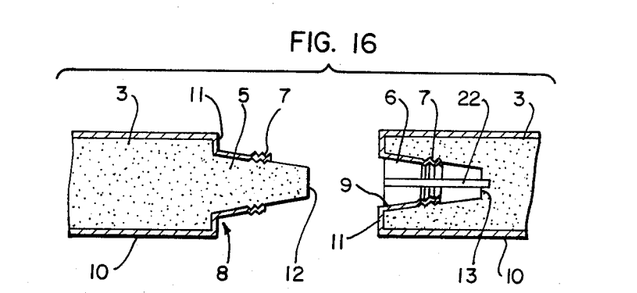
Figure 17:
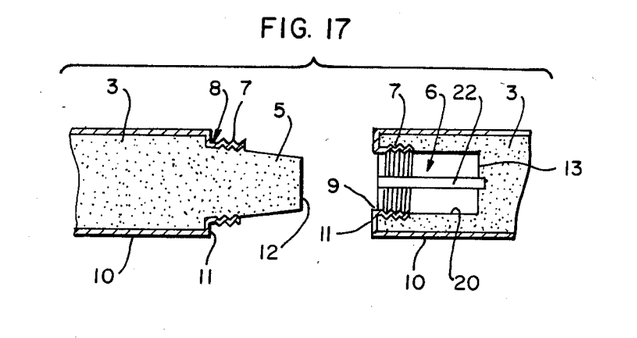
Figure 18:
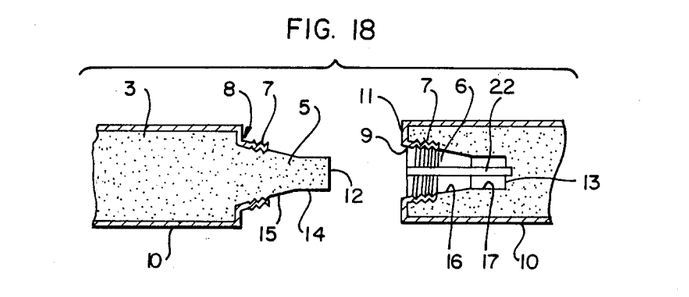
Figure 19:
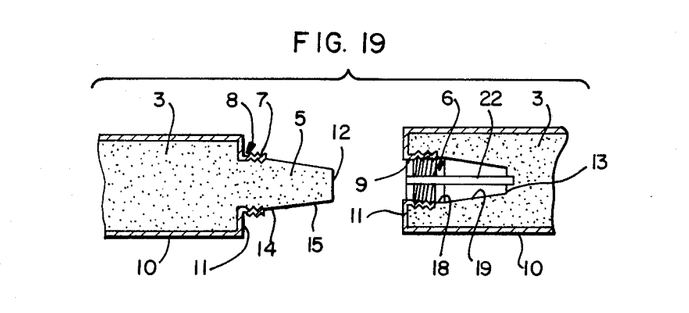
Figure 20:
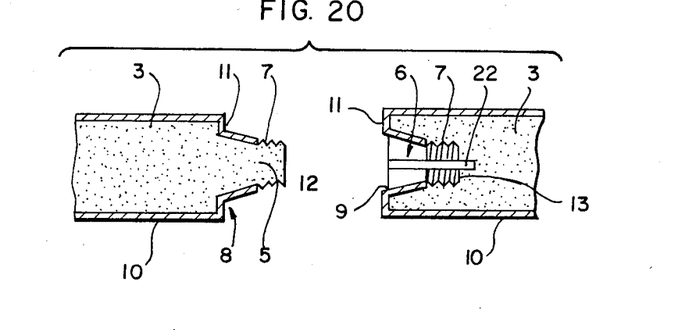
Figure 21:
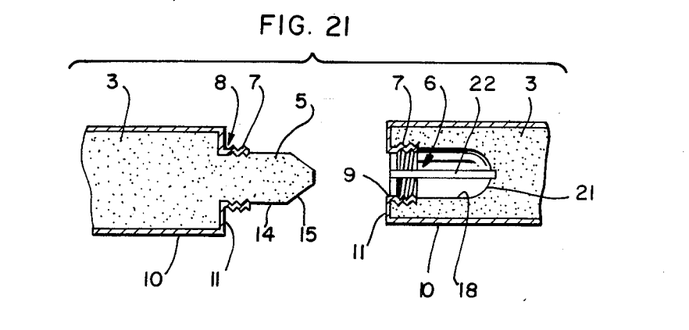

A modification shown in FIG. 12 includes a projection 5 having a cylindrical portion 14 at the foot side thereof and a frusto-conical boss 20 integrally formed at the tip of the cylindrical portion 14. External screw threads 7 are formed on the foot portion 8 of the cylindrical portion 14. A socket hole 6 coacting with the projection 5 includes a cylindrical hole 18 with internal screw threads 7 at the open end side thereof and a spherical bottom surface 21. This modification indicates that the shape of the bottom portion of the socket hole 6 is not required to be the same as that of the tip portion of the projection 5, provided that the bottom portion is large enough to receive the tip portion.

In the carbon rod assembly according to the present invention, the projection 5 or the socket hole 6 can be bisected by forming an axial slit therethrough in parallel with the longitudinal axial direction of the carbon rod piece 3. FIG. 13 through FIG. 21 show embodiments formed by providing a slit 22 in each of the socket holes 6 of the embodiments of FIG. 4 through FIG. 12, respectively. In each of the embodiments of FIG. 13 through 21, the dimensions of the projection 5 and the socket hole 6 with the slit 22 are selected in such a manner that the bisected socket hole 6 resiliently engages the projection 5, and such resilient engagement improves the tightness of the coupling between the projection 5 and the socket hole 6.

When the slit 22 is provided, the metallic coating 10 on the outer periphery of the carbon rod piece 3 may be extended continuously onto the entire outer surface of the projection 5 and onto the entire inner surface of the socket hole 6 including the surfaces of the slit 22. The thus extended metallic coating 10 has various advantages such as strengthening of the screw threads 7, improvement of the sliding engagement of the projection 5 with the socket hole 6 in position, and enhancement of the firmness of the coupling between the projection 5 and the socket hole 6.

Now, the invention will be described in further detail by referring to examples.

EXAMPLE 1

Twenty samples of the carbon rod assembly according to the present invention were prepared, each sample having an outside diameter of 13 mm, a length of 430 mm, and a screw thread pitch of 1 mm. Twenty samples for each of the reference samples types A, B, and C were prepared by using the structure of FIG. 2 as disclosed by Japanese Utility Model Publication No. 32,059/72. The features of reference sample types A, B, and C are as follows:

Sample type A : Carbon rod piece 3 whose connecting portion had a length which was the same as the outer diameter of the threaded portion of the projection 5.
Sample type B : Carbon rod piece 3 whose connecting portion had a length which was 1.5 times the outer diameter of the threaded portion of the projection 5.
Sample type C : Carbon rod piece 3 whose connecting portion had a length which was 2 times the outer diameter of the threaded portion of the projection 5.

Various tests were carried out on the samples of the invention and the reference samples, and the results are shown in Table 1.

TABLE 1

| Test items | Samples of the invention | Reference samples | | |
|---|---|---|---|---|
| | | Type A | Type B | Type C |
| Rate of failure during manufacture | 0 (%) | 3 (%) | 20 (%) | 23 (%) |
| Time necessary for connecting carbon rods | 0.8 (sec) | 3.8 (sec) | 6.8 (sec) | 9.3 (sec) |
| Rate of breakage during connection of carbon rods | 0 (%) | 5 (%) | 10 (%) | 20 (%) |
| Bending stress at the connected portion (with a span of 5 cm) | 100 (kg) | 65 (kg) | 70 (kg) | 70 (kg) |

When the pitch of the screw thread of the reference samples was reduced to 0.5 mm, the rate of failure during manufacture was reduced to one half, but the time necessary for manufacture and the time necessary for connecting the carbon rods were both doubled.

EXAMPLE 2

Twenty samples of the carbon rod assembly of the present invention and twenty samples of conventional carbon rod assembly were prepared, each sample having an outside diameter of 13 mm and a length of 430 mm. Various tests were carried out on the samples, and the results are shown in Table 2.

TABLE 2

| Test items | Sample of the invention | Sample of the prior art |
|---|---|---|
| Force necessary for connecting carbon rods | 1.5 (kg) | 10 (kg) |
| Bending stress at the connected portion (with a span of 5 cm) | 100 (kg) | 75 (kg) |
| Diameter change after carbon rod connection | None | 0.3 (mm) |

Table 2 shows that the force necessary for connecting carbon rods in the assembly of the present invention is less than about one sixth of that required in the prior art. To reduce the force necessary for connecting carbon rods to a similar level in the structure of the prior art, if carbon rod pieces having socket holes bisected by slits were used, the outside diameter of the slit portion was increased by the insertion of the projection of the carbon rod piece being connected, so that a stepped portion was formed in the carbon rod piece between the non-slit portion adjacent the inserted projection and the projection-inserted slit portion. Accordingly, when the thus increased diameter portion is moved to the holder 2 of FIG. 1 for gripping thereby, smooth sliding of the assembled carbon rod pieces through the holder 2 was hampered by the presence of the above-mentioned stepped portion.

The Examples proved that, as compared with the conventional carbon rod assemblies of the push-in type and the impracticable screw type, the carbon rod assembly of the present invention has improvements in many practical aspects.

As described in the foregoing, the carbon rod assembly of the present invention provides the following outstanding effects in comparison with the conventional carbon rod with a fully threaded projection and a fully threaded socket hole and a metallic coating covering the threaded surfaces.

(1) The time necessary for maufacture is short. In the case of the conventional carbon rod with the fully threaded projection and the fully threaded socket hole, at least 20 seconds of machining time is necessary to thread each of the projection and the socket holes. On the other hand, in the case of the partial threading of the carbon rod piece of the invention, the machining time is reduced to less than one-tenth of that of the above-mentioned conventional carbon rods.

(2) The manufacturing failure rate is reduced to about one-tenth of the prior art. Since the carbonaceous material of the carbon rod is brittle as compared with metallic materials, conventional carbon rods having fully threaded projections and fully threaded socket holes are susceptible to a high rate of manufacturing failure such as faulty external and internal screw threads which cannot mesh or are hard to mesh. On the other hand, in the carbon rod assembly of the present invention, the number of turns of the screw threads is very small, so that the rate of manufacturing failure is greatly reduced.

(3) The rate of breakage of the screw threads during handling is greatly reduced. Screw threads with a large number of turns are susceptible to a comparatively high rate of screw thread damage, but the present invention uses only one half to three turns of screw threads, so that the probability of screw threads damage is greatly reduced. Besides, the carbon rod assembly of the invention ensures firm coupling even when the screw threads are partially damaged, because the present invention uses both the engagement of the projection with the socket hole and the meshing of the screw threads to attain the coupling of the adjacent two carbon rod pieces.

(4) A practiable carbon rod assembly with screw threads is provided. Heretofore, carbon rod pieces with fully threaded projections and fully threaded socket holes for connection have never been used as pointed out in the foregoing. Since the carbon rod assembly of the present invention uses only one half to three turns of screw threads to allow full meshing by rotation of a comparatively small angle, the operator can complete the connection of adjacent carbon rod pieces substantially in an instant fashion by rotating the carbon rod piece one half to three revolutions with one hand while holding the heavy holder with his other hand. Accordingly, the present invention provides for the connection of adjacent carbon rod pieces without disturbing the arc gouging and blasting operations to any significant extent. Even when the conventional carbon rod assembly without screw threads is used, high skill and sharp intuition of experienced operators are indispensable to attain good carbon rod connection under the conditions of high ambient temperature for arc gouging and blasting, because although the threadless assembly allows an instant connection the assembly requires a properly-exerted large force to establish a good connection, and a too weak force may cause a possible separation of the connected carbon rods while a too strong force may cause a possible breakage of the coupling portions of the carbon rods. The carbon rod assembly without screw threads of the prior art has a disadvantage in that the connected portion tends to have a high electric resistance and heat is generated at the high contact resistance during the arc gouging and blasting operation and the carbonaceous material of the connected portion of the carbon rods tends to be eroded by oxidation at an elevated temperature due to the heat generation, so that rather frequent separation of the once connected carbon rods has been experienced and the arc gouging and blasting operations had to be interrupted accordingly. The carbon rod assembly of the present invention mitigates the above-mentioned disadvantage of the conventional carbon rod assembly without screw threads. Typical failure rate of the conventional carbon rod assembly without screw threads during the connection has been about 3%, while that of the present invention is expected to be about only 0.3%.

(5) The projection of the carbon rod piece of the present invention can be very easily aligned with the coacting socket hole, because the tip of the projection has a reduced diameter and the number of turns of the screw threads is small.

Although the invention has been described with a certain degree of particularity, it is understood that the present disclosure has been made only by way of example and that numerous changes in details of construction and combination and arrangement of parts may be restored to without departing from the scope of the invention as hereinafter claimed.

What is claimed is:

1. A carbon rod assembly for arc gouging and blasting of a metallic article, comprising:

a first carbon rod piece having a substantially frusto-conical axial projection formed at one end thereof, the diameter of said projection being smaller than the diameter of said first carbon rod piece at said one end thereof and decreasing as said projection extends away from said first carbon rod piece, said projection having from one-half to three turns of external screw threads formed on a foot portion thereof, and a conductive metallic coating continuously covering the outer periphery of said first carbon rod piece and said external threads; and a second carbon rod piece having a frusto-conical axial socket hole formed at an open end thereof, the diameter of said socket hole being smaller than the diameter of said second carbon rod piece, said socket hole having from one-half to three turns of internal screw threads formed adjacent said open end portion thereof, and a conductive metallic coating continuously covering the outer periphery of said second carbon rod piece and said internal screw threads;

wherein said substantially frusto-conical projection and said frusto-conical axial socket hole have the same taper, the axial length of said projection being smaller than the axial depth of said socket hole, wherein said socket hole of said second carbon rod piece is bisected by an axial slit formed at said open end of said second carbon rod piece, whereby said first and second carbon rod pieces are adapted to be firmly joined together by inserting said projection into said socket hole and rotating said carbon rod pices relative to each other.

2. The carbon rod assembly of claim 1, wherein said axial slit has an axial length greater than the axial depth of said socket hole.

3. A carbon rod assembly for arc gouging and blasting of a metallic article, comprising:

a first carbon rod piece having an axial projection at one end thereof, said projection including a frusto-conical foot portion and an axially aligned cylindrical portion integrally formed at a tip of said frusto-conical foot portion, the diameter of said projection being smaller than the diameter of said first carbon rod piece at said one end thereof, said tip of said frusto-conical foot portion and said cylindrical portion having substantially the same diameter, said projection having from one-half to three turns of external screw threads formed at said frusto-conical foot portion thereof, and a conductive metallic coating continuously covering the outer periphery of said first carbon rod piece and said external threads; and a second carbon rod piece having an axial socket hole formed at an open end thereof, said socket hole having a frusto-conical hole at said open end and a cylindrical hole integrally formed at the bottom of said frusto-conical hole, said socket hole having from one-half to three turns of internal screw threads formed adjacent said open end portion thereof, and a conductive metallic coating continuously covering the outer periphery of said second carbon rod piece and said internal screw threads;

wherein said frusto-conical portion of said projection and said frusto-conical portion of said socket hole have the same taper, the axial length of said projection being smaller than the axial depth of said socket hole, wherein said socket hole of said second carbon rod piece is bisected by an axial slit formed at said open end of said second carbon rod piece, whereby said first and second carbon rod pieces are adapted to be firmly joined together by inserting said projection into said socket hole and rotating said carbon rod pieces relative to each other.

4. The carbon rod assembly of claim 3, wherein said axial slit has an axial length greater than the axial depth of said socket hole.

5. A carbon rod assembly for arc gouging and blasting of a metallic article, comprising:

a first carbon rod piece having an axial projection at one end thereof, said projection including a cylindrical foot portion and an axially aligned frusto-conical portion integrally formed at a tip of said cylindrical foot portion, the diameter of said projection being smaller than the diameter of said first carbon rod piece at said one end thereof, said cylindrical portion and a foot of said frusto-conical portion having substantially the same diameter, said projection having from one-half to three turns of external screw threads formed at said cylindrical foot portion thereof, and a conductive metallic coating continuously covering the outer periphery of said first carbon rod piece and said external threads; and a second carbon rod piece having an axial socket hole formed at an open end thereof, said socket hole having a cylindrical hole at said open end and a frusto-conical hole extending from a tip of sayd cylindrical hole, said socket hole having from one-half to three turns of internal screw threads formed adjacent said open end portion thereof, and a conductive metallic coating continuously covering the outer periphery of said second carbon rod piece and said internal screw threads;

wherein said frusto-conical portion of said axial projection and said frusto-conical portion of said socket hole have the same taper, the axial length of said projection being smaller than the axial depth of said socket hole, wherein said socket hole of said second carbon rod piece is bisected by an axial slit formed at said open end of said second carbon rod piece, whereby said first and second carbon rod pieces are adapted to be firmly joined together by inserting said projection into said socket hole and rotating said carbon rod pieces relative to each other.

6. The carbon rod assembly of claim 5, wherein said axial slit has an axial length greater than the axial depth of said socket hole.

* * * * *